Sept. 20, 1949. H. J. CLEMMER 2,482,320
DRAG SCRAPER CONSTRUCTION
Filed Nov. 19, 1945 2 Sheets-Sheet 2
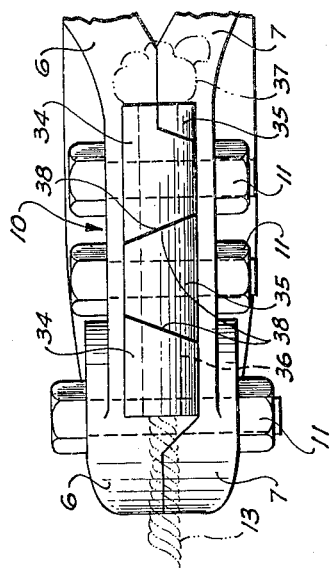
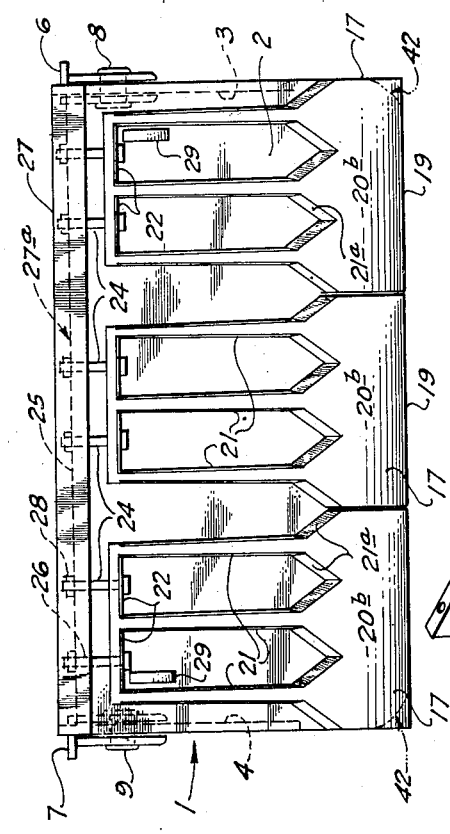
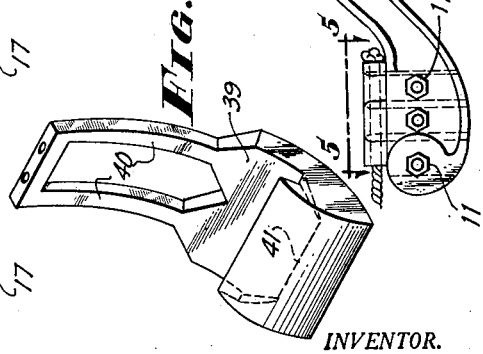
INVENTOR.
*Harry J. Clemmer*
BY
*ATTORNEY*

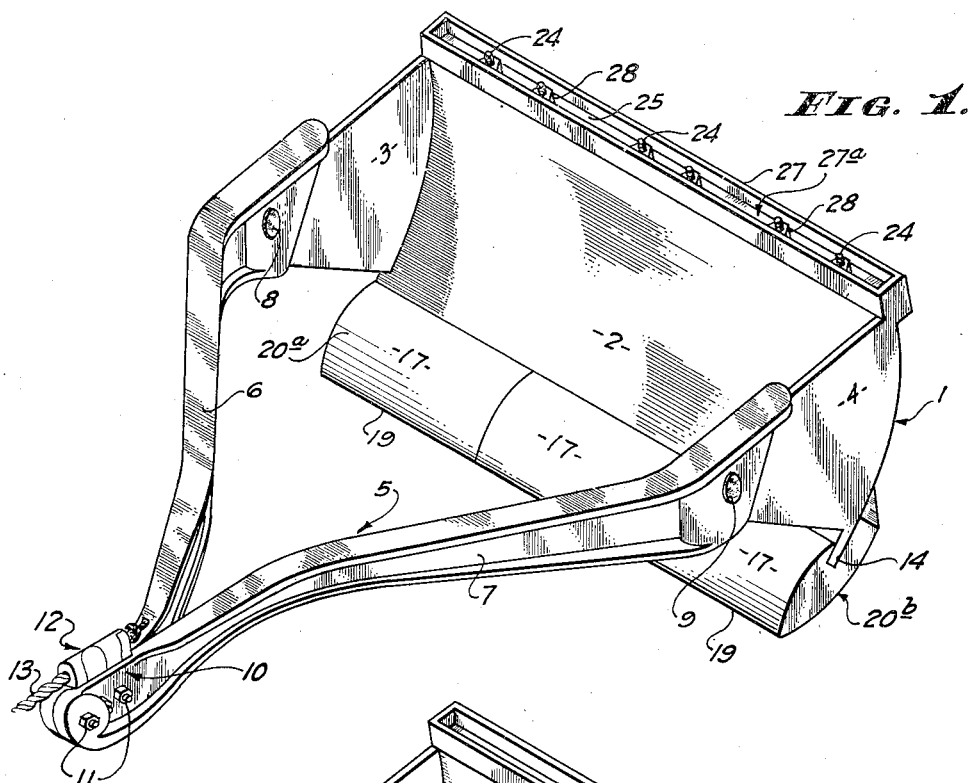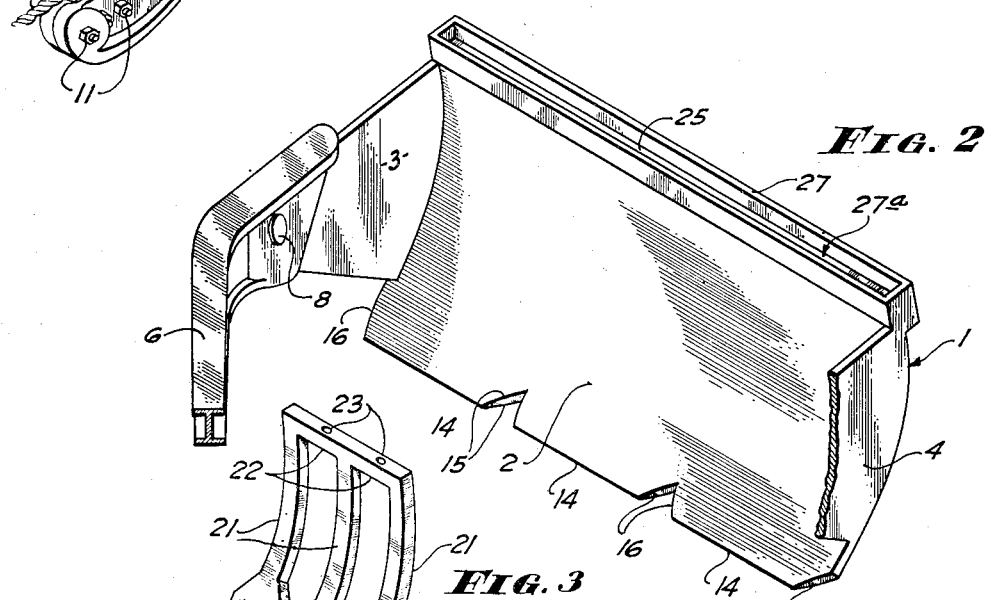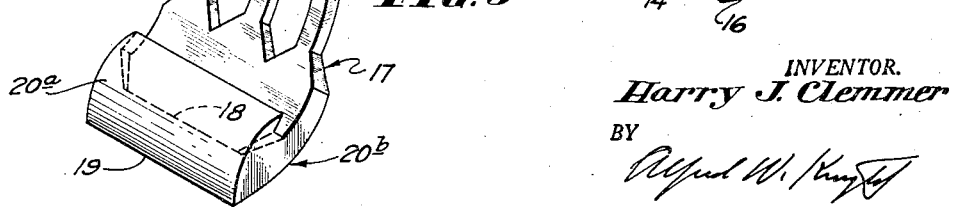

Patented Sept. 20, 1949

2,482,320

UNITED STATES PATENT OFFICE 2,482,320

DRAG SCRAPER CONSTRUCTION

Harry J. Clemmer, Holden, Wash.

Application November 19, 1945, Serial No. 629,531

6 Claims. (Cl. 37—147)

This invention relates generally to the art of drag scrapers, and pertains particularly to a drag scraper provided with a hingedly mounted bail member whereby the scraper portion is caused to adopt different positions during the forward and rearward hauling operations.

One of the particular objects of the invention is to provide a drag scraper construction having a pivotedly mounted bail and an advantageous form of replaceable wearing teeth on the bucket portion of the scraper, the hinged mounting of the bail, taken with the structure of the removable wearing teeth, being such as to distribute wear upon the digging lip and substantially eliminate wear on the digging points or edges during the black haul operation, whereby a particularly long-lived construction is realized.

A further object of the invention is to provide a drag scraper construction provided with a plurality of removable digging teeth which cooperate to provide a substantially continuous digging edge.

A further object of the invention is to provide a drag scraper construction having an improved form of cable or haul rope attachment for both the front-haul and rear-haul application of operating forces.

A further object of the invention is to provide a drag scraper construction which is simply fabricated, and readily maintained in optimum operative condition.

Other objects and features of this invention will be brought out in the ensuing description of a certain preferred embodiment thereof, or will be apparent from such description. The accompanying drawings illustrate a scraper construction according to this invention, and referring thereto:

Fig. 1 is a perspective view of a drag scraper incorporating the features of this invention;

Fig. 2 is a fragmentary view corresponding to that of Fig. 1, showing the forward-haul bail broken away and the removable digging or scraper teeth removed;

Fig. 3 is a perspective view illustrating a form of scraper tooth which may be used with constructions of Figs. 1 and 2;

Fig. 4 is side elevation of the scraper of Fig. 1 showing the front-haul position of the scraper body or bucket portion in full lines and the rear-haul position thereof in dot-dash lines;

Fig. 5 is a fragmentary detail thereof as taken on line 5—5 in Fig. 4;

Fig. 6 is a rear elevation of the scraper as taken on line 6—6 in Fig. 4; and

Fig. 7 is a view corresponding to Fig. 3, showing a modified form of scraper tooth which may be employed in the present construction.

Referring to Figs. 1 through 6 of the drawings, the device may comprise a scraper body or bucket portion 1 provided with a forwardly concave back-plate 2 and a pair of forwardly projecting side-arms or side-plates 3 and 4 upon which a bail 5 is pivotally mounted. The bail 5 may comprise a pair of bail arms 6 and 7 pivotally mounted on the respective side-plates 3 and 4, through the agency of hinge pins, as at 8 and 9, and interlocked at their front ends as at 10. Suitable attaching bolts 11 are provided for interlocking the forward ends of the bail arms, and a front-haul rope hitch 12 is provided to engage a front-haul rope or cable 13. The forwardly directed lower edge of the back-plate 2 of the scraper body is provided with a plurality of lugs 14, corresponding in number to the desired number of scraper teeth to be employed in a particular construction, and each lug being provided with a forward and rearward taper as at 15 at its lower edge, and lateral taper as at 16, at the lateral edges to facilitate proper retention of the scraper teeth upon the scraper body. A plurality of removable scraper teeth 17 are provided, corresponding in number to the lugs 14, each of said scraper teeth being provided with a socket 18 coactingly shaped to fit the respective lugs 14, a lower or forwardmost digging edge 19, a forwardly and upwardly directed wear surface 20a adapted to overlie the forward edge of the lugs 14, and a rearwardly sloped wear surface 20b adapted to underlie the lugs 14 and extend upwardly therebeyond over the rearward surface of the back-plate 2 an appreciable distance. The scraper teeth are provided with a plurality of upwardly extending attachment arms 21, extending rearwardly from the surface 20b as at 21a, which arms 21 are preferably inter-connected at the upper rearward ends thereof through a cross connector bar 22 which is adapted for attachment to the upper edge of the back-plate of the scraper body. For this latter purpose the cross connector bar 22 is provided with a plurality of bolt openings 23, through which bolts 24 may be extended and caused to enter coactingly placed bolt holes 26 in an attachment ledge 25 located adjacent the upper edge of the back-plate 2. I preferably provide a channel-like construction extending upwardly from the attachment ledge 25, as at 27, to form a recess 27a within which the nuts 28 disposed upon the projecting ends of the bolts 24 may lie, in a position such as to be maintained out of the way of engagement with the back-haul hitch construction hereinafter described.

In order to provide for the back-haul application of operating forces, I provide a pair of back-haul lugs 29 adjacent the upper edge of the back-plate 2, to which a back-haul chain yoke 30 is attached, terminating in a back-haul coupling link and rope hitch 31 provided with a tubular member 32 within which the back-haul rope may be disposed. The forward end of the back-haul rope or cable 33 is carried through the tubular structure 32 and a knot 33a is tied therein, which knot will serve to retain the rope against withdrawal through the member 31 upon application of the back-haul forces.

The interlock construction 10 and the joining forward ends of the bail arms 6 and 7 may conveniently be formed in such manner as to not only effect the desired interlock of the two arm portions against relative forward and rearward movement, but to provide also for the attachment of the forward haul rope or cable 13 in such manner that forward ends of the bail arms would be retained in position independent of the loss of the locking bolts 11, it being appreciated that in the rough handling which an apparatus of this type encounters in actual use, such things as bolts are not uncommonly lost without being immediately detected by the operator, who may be located at some distance from the operating position of the drag bucket. For this purpose I provide a plurality of coactingly shaped lug portions 34 and 35 on the respective bail arms 6 and 7, each of the lug portions being provided with a central opening adapted to aline with one another and form a forwardly directed passage or opening 36 within which the front-haul rope 13 may be extended. When a knot 37 is tied in the rearward end of the front-haul rope or cable 13, this cable serves both to provide for the application of the desired front-haul forces, and to retain the forward ends of the arms 6 and 7 against dislocation in the event that the bolts 11 become dislodged. For this purpose the coacting lug portions 34 and 35 may be provided with transversely inclined or taper edges 38 extending through the full vertical height of the structure 10.

While in Figs. 1 through 6 I have illustrated the scraper body as provided with three removable scraper teeth 17, considerable utility is gained by providing four teeth rather than three, and the necessarily narrowed tooth structure which would be used were four teeth to be provided is illustrated in Fig. 7, at 39. This modified form of tooth has a lug receiving socket 41 and attachment arms 40 corresponding in function to the parts designated at 18 and 21 in Fig. 3.

The pivotal mounting of the bail arms 6 and 7 on the respective side plates 3 and 4 may be accomplished by providing a recess 5a at the rearward ends of each of the arms, within which the forwardly projecting portions of the side arms may project, as indicated at 4a in Fig. 4. The downwardly directed wall of the recess 5a, indicated at 5b in Fig. 4, may be employed to engage the upper edge of the side arm indicated at 4b in Fig. 4 to restrict the pivotal movement of the scraper body portion in a counter-clockwise direction in Fig. 4 against the forces applied during the front-haul operation. Similarly the rearwardly directed wall 5c of the recess 5a may be employed to engage the forwardly directed edge 4c of the side arm 4, for example, to restrict the clockwise rotation of the scraper body portion 1 under the influence of the rear-haul forces. The amount of movement provided in the pivotal mounting of the bail arms to the scraper body portion will preferably be such as to dispose the digging edge 19 of the scraper teeth in proper position during the forward-haul for digging engagement with the material to be operated upon, such as a position below an intermediate portion of the scraper body 1 as indicated in full lines in Fig. 4, and the rotated position of the scraper body portion under the influence of the back-haul forces will be such as to locate the wear surface 20 of the teeth 17 in some such position as indicated in dot-dash lines in Fig. 4, generally vertically below the hinge axis provided by the hinge pins 8 and 9. The point of application of the rear-haul forces in the initiation of a rear-haul operation is preferably made as high as is conveniently possible along the rearward face of the back-plate 1, such as indicated at 29, having in mind the installation requirement of the teeth 17, and this point of application will preferably be located above the pivot axis defined by the pins 8 and 9. As the scraper body is drawn backwardly, the scraper body or bucket portion 1 tends to pivot about the digging edge 19, rotating the scraper body portion clockwise (Fig. 4) to a position such that the back-haul lugs 29 are brought below the pivot line of the hinge pins 8 and 9, causing the wear surface 20 to be disposed substantially below the pivot axis. The wear upon the teeth 17 during the back-haul operation is therefore confined to a point somewhat removed from the digging edge 19, and serves to sharpen this edge instead of wearing it transversely and dulling it as is common with conventional scraper constructions. The principal wear on the construction will occur at the outside corners of the tooth assembly, as indicated by the arrows 42 in Fig. 6, and when this wear has become objectionable, it is merely necessary to reverse the positions of the edge teeth, to bring the worn portions interiorly of the scraper bucket in a transverse direction. This provides in the form shown in Fig. 6 three complete replacements of the scraper tooth assembly, and if four teeth are provided, eight separate wear edge corners will result, as will be apparent to those skilled in the art.

When a back-haul movement has been effected, the re-establishment of the front-haul effort on the bail 5 will first cause the scraper body 1 to rotate in a counter-clockwise direction (Fig. 4) as a result of the forward pull of the arms 6 and 7 which are attached to the upper portions of the side plates 3 and 4. The scraper body will pivot about the scraper teeth 17 until the edge portions 19 are brought firmly into engagement with the surface upon which the scraper is operated and the side plates 3 and 4 bear against the limit stops provided by the upper surfaces of the recesses 5a. In this ("front-haul") position, further front-haul effort will move the scraper bodily, producing the desired excavation.

It will be observed that the present drag-scraper construction is arranged so that the attachment of the separable scraper teeth 17 is accomplished by attachment means located wholly out of the wear position (adjacent the wear surfaces 20a and 20b), eliminating the presence of bolts or rivets in the wear zones. The location of the attaching bolts 24 within the channel or recess 27a prevents inadvertent "hang-up" of the back-haul cable or the back-haul chain yoke 30. The provision of the hinged bail construction permits the utilization of a rather rugged and heavy bail construction and eliminates the normal tendency for the bail to flail about during the back-haul movement. Where the bail is made so heavy as to of itself eliminate the flailing of the bail during the back-haul, the dead-load imposed is impractical from the standpoint of wear upon the digging teeth during both back-haul and front-haul movements. The back-haul movement of the present form of scraper is rendered smooth and uniform as a result of the friction load being disposed upon the curved lower wear surface 20 in the pivotally moved position of the scraper body, as illustrated in Fig. 4.

I appreciate that those skilled in the art will conceive of modifications in the present-described structure, and I therefore do not consider my invention as limited to the specific details herein delineated and described, but rather to the scope of the subjoined claims.

I claim:

1. A drag scraper construction which comprises: a scraper body provided with two laterally spaced forwardly projecting side-plate portions and a connecting back-plate portion having a forwardly concave conformation, said back-plate portion being provided with a lower edge portion extending below said projecting side-plate portions and said lower edge defining a plurality of laterally-spaced depending lugs, the lower ends of said lugs being wedge shaped both forwardly-and-rearwardly and laterally; a front-haul bail pivotally connected to said scraper body at the forward end of said side-plate portions; a scraper tooth attached to said scraper body at the position of each of said lugs, said teeth being provided with locating sockets coactingly shaped with respect to said lugs for lateral and forward-and-rearward placement thereupon, and each of said teeth being provided with a downwardly-and-forwardly projecting excavating edge portion, an upwardly and rearwardly extending wear portion adapted to underlie the rearward face of said back-plate portion at the position of said lower edge, and a plurality of attachment arms extending upwardly from said wear portion toward the upper edge of said back-plate portion; attachment means securing said attachment arms to the upper edge of said back-plate portion, and the upper edge of said back-plate portion being provided wth an upwardly directed channel member, and the portions of said attachment means cooperating with said back-plate portion being disposed within said channel member so as to be recessed therein.

2. A drag scraper construction which comprises: a scraper body provided with two laterally spaced forwardly projecting side-plate portions and a connecting back-plate portion having a forwardly concave conformation, said back-plate portion being provided wth a lower edge portion extending below said projecting side-plate portions and said lower edge defining a plurality of laterally-spaced depending lugs; a front-haul bail pivotally connected to said scraper body at the forward ends of said side-plate portions; a scraper tooth attached to said scraper body at the position of each of said lugs, said teeth being provided with locating sockets coactingly shaped with respect to said lugs for lateral and forward-and-rearward placement thereupon, and each of said teeth being provided with a downwardly-and-forwardly projecting excavating edge portion, an upwardly and rearwardly extending wear portion adapted to underlie the rearward face of said back-plate at the position of said lower edge, and a plurality of attachment arms extending upwardly from said wear portion toward the upper edge of said back plate; and attachment means securing said attachment arms to the upper edge of said back plate.

3. A drag scraper construction which comprises: a scraper body provided with two laterally-spaced forwardly projecting side-plate portions and a connecting back-plate portion having a forwardly concave conformation, said back-plate portion being provided with a lower edge portion extending below said projecting side-plate portions and said lower edge defining a plurality of laterally-spaced depending lugs, and the lower ends of said lugs being wedge shaped both forwardly-and-rearwardly and laterally; a front-haul bail pivotally connected to said scraper body at the forward end of said side-plate portions; a scraper tooth attached to said scraper body at the position of each of said lugs, said teeth being provided with locating sockets coactingly shaped with respect to said lugs for lateral and forward-and-rearward placement thereupon, and each of said teeth being provided with a downwardly-and-forwardly projecting excavating edge portion, and an upwardly and rearwardly extending wear portion adapted to underlie the rearward face of said back-plate at the position of said lower edge; and attachment means for said teeth located adjacent the upper edge of said back-plate portion.

4. A drag scraper construction which comprises: a scraper body provided with two laterally-spaced forwardly projecting side-plate portions and a connecting back-plate portion having a forwardly concave conformation, said back-plate portion being provided with a lower edge portion extending below said projecting side-plate portions and said lower edge defining a plurality of laterally-spaced depending lugs; a front-haul bail pivotally connected to said scraper body at the forward end of said side-plate portions; a scraper tooth attached to said scraper body at the position of each of said lugs, said teeth being provided with locating sockets coactingly shaped with respect to said lugs for lateral and forward-and-rearward placement thereupon, and each of said teeth being provided with a downwardly-and-forwardly projecting excavating edge portion, and an upwardly and rearwardly extending wear portion adapted to underlie the rearward face of said back-plate at the position of said lower edge; and attachment means for said teeth located adjacent the upper edge of said back-plate portion.

5. A drag scraper construction which comprises: a scraper body provided with two laterally spaced forwardly projecting side-plates and a connecting back-plate having a lower edge portion extending below the projecting side-plates; a bail pivotally connected to said scraper body at the upper portions of said side-plates; a plurality of scraper teeth attached to said back-plate in engagement with said lower edge portion, each of said scraper teeth having an upwardly and rearwardly extending wear portion adapted to underlie the rearward face of said back-plate and extend upwardly therewith to adjacent the upper end thereof and a downwardly-and-forwardly projecting excavating edge portion defining a substantial continuation of said upwardly and rearwardly extending portion; attachment means at the upper portion of said back-plate cooperating with the upper portions of said extending portions of said scraper teeth to secure said teeth to said back-plate; and limit stop means associated with the pivotal attachment of said bail to said scraper body, said limit stop means being adapted to constrain the relative pivotal movement of said scraper body and said bail between a rearward "front-haul" position in which the excavating edge portions of said scraper teeth are disposed below an intermediate portion of said scraper body, and a forward "back-haul" position in which the wear portions of said scraper teeth are disposed approximately vertically below the axis of pivotal attachment of said bail.

6. A construction as set forth in claim 5, and comprising in addition: back-haul attachment means secured to said back-plate at a position such as to be normally disposed above the level of the pivotal connection of said bail to said scraper body when said scraper body and bail are disposed in the rearward "front-haul" position, and below the level of said pivotal attachment when said scraper body and said bail are in said forward "back-haul" position.

HARRY J. CLEMMER.

REFERENCES CITED

The following references are of record in the file of this patent:

UNITED STATES PATENTS

| Number | Name | Date |
| --- | --- | --- |
| 1,154,357 | West | Sept. 21, 1915 |
| 1,397,751 | Allington | Nov. 22, 1921 |
| 1,544,222 | Crosby | June 30, 1925 |
| 1,638,099 | Rorabeck | Aug. 9, 1927 |
| 2,402,314 | Crane | June 18, 1946 |